US012736005B2

(12) United States Patent
Barberger et al.

(10) Patent No.: US 12,736,005 B2
(45) Date of Patent: Sep. 15, 2026

(54) AIRCRAFT POWER PLANT WITH HEAT MANAGEMENT SYSTEM

(71) Applicant: PRATT & WHITNEY CANADA CORP., Longueuil (CA)

(72) Inventors: Jeremie Barberger, Montreal (CA); Michel Bousquet, Longueuil (CA); Etienne Plamondon, Longueuil (CA); Francois Belleville, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/589,551

(22) Filed: Feb. 28, 2024

(65) Prior Publication Data

US 2025/0270951 A1 Aug. 28, 2025

(51) Int. Cl.
*F02B 55/10* (2006.01)
*B64D 33/08* (2006.01)
*F28D 21/00* (2006.01)

(52) U.S. Cl.
CPC .............. *F02B 55/10* (2013.01); *B64D 33/08* (2013.01); *F28D 2021/0026* (2013.01)

(58) Field of Classification Search
CPC .. F02B 55/10; B64D 33/08; F28D 2021/0026
See application file for complete search history.

(56) References Cited

U.S. PATENT DOCUMENTS 3,907,468 A 9/1975 Green et al.
3,964,445 A 6/1976 Ernest et al.
(Continued)

FOREIGN PATENT DOCUMENTS

DE 102015007076 A1 1/2017
EP 1892398 A1 2/2008
(Continued)

OTHER PUBLICATIONS

European Search Report issued in counterpart EP application No. 25160729.7 on Jul. 18, 2025.
(Continued)

*Primary Examiner* — Long T Tran
*Assistant Examiner* — Charles J Brauch
(74) *Attorney, Agent, or Firm* — NORTON ROSE FULBRIGHT CANADA LLP

(57) ABSTRACT

An aircraft power plant, has: a thermal engine having a combustion chamber inside a housing defining a coolant passage, and an oil passage; and a heat management system including: an oil-to-coolant heat exchanger having an oil conduit in fluid communication with the oil passage and a first coolant conduit in heat exchange relationship with the oil conduit and in fluid communication with the coolant passage; and a coolant-to-air heat exchanger having a second coolant conduit in fluid communication with the coolant passage and an air conduit in heat exchange relationship with the second coolant conduit and in fluid communication with an environment outside the aircraft power plant, wherein the coolant passage inlet and the coolant passage outlet of the coolant passage of the housing are fluidly connected to one another via the first coolant conduit of the oil-to-coolant heat exchanger and the second coolant conduit of the coolant-to-air heat exchanger.

16 Claims, 9 Drawing Sheets

(56) References Cited

U.S. PATENT DOCUMENTS

| | | | | |
|---|---|---|---|---|
| 10,920,656 | B2 | 2/2021 | Julien et al. | |
| 2012/0324903 | A1 * | 12/2012 | Dewis | F01D 15/02 60/801 |
| 2016/0245161 | A1 | 8/2016 | Thomassin et al. | |
| 2020/0385138 | A1 | 12/2020 | Dionne | |
| 2025/0084783 | A1 | 3/2025 | Bousquet et al. | |

FOREIGN PATENT DOCUMENTS

| | | | | |
|---|---|---|---|---|
| EP | 2006493 | A2 | 12/2008 | |
| EP | 1892389 | B1 | 2/2009 | |
| WO | 2012/066072 | A2 | 5/2012 | |
| WO | 2017024392 | A1 | 2/2017 | |
| WO | WO-2020201034 | A1 * | 10/2020 | F02C 7/14 |

OTHER PUBLICATIONS

European Search Report issued in related EP application No. 26170722.8 on May 22, 2026.

* cited by examiner 10
9
11
8
11C
18C
18
19B
19
18C
18
11C
11
12

60
18C
18
18A
18D
20
12
18L
18I
18B
11
18E
28
32
42
22
18F
24
18G
30
R
32
40
26
18E
32
34
18J
36
34
38
18K
10
18D 11,19
11A,19A
11C,19B
11D,19C
11E,19D

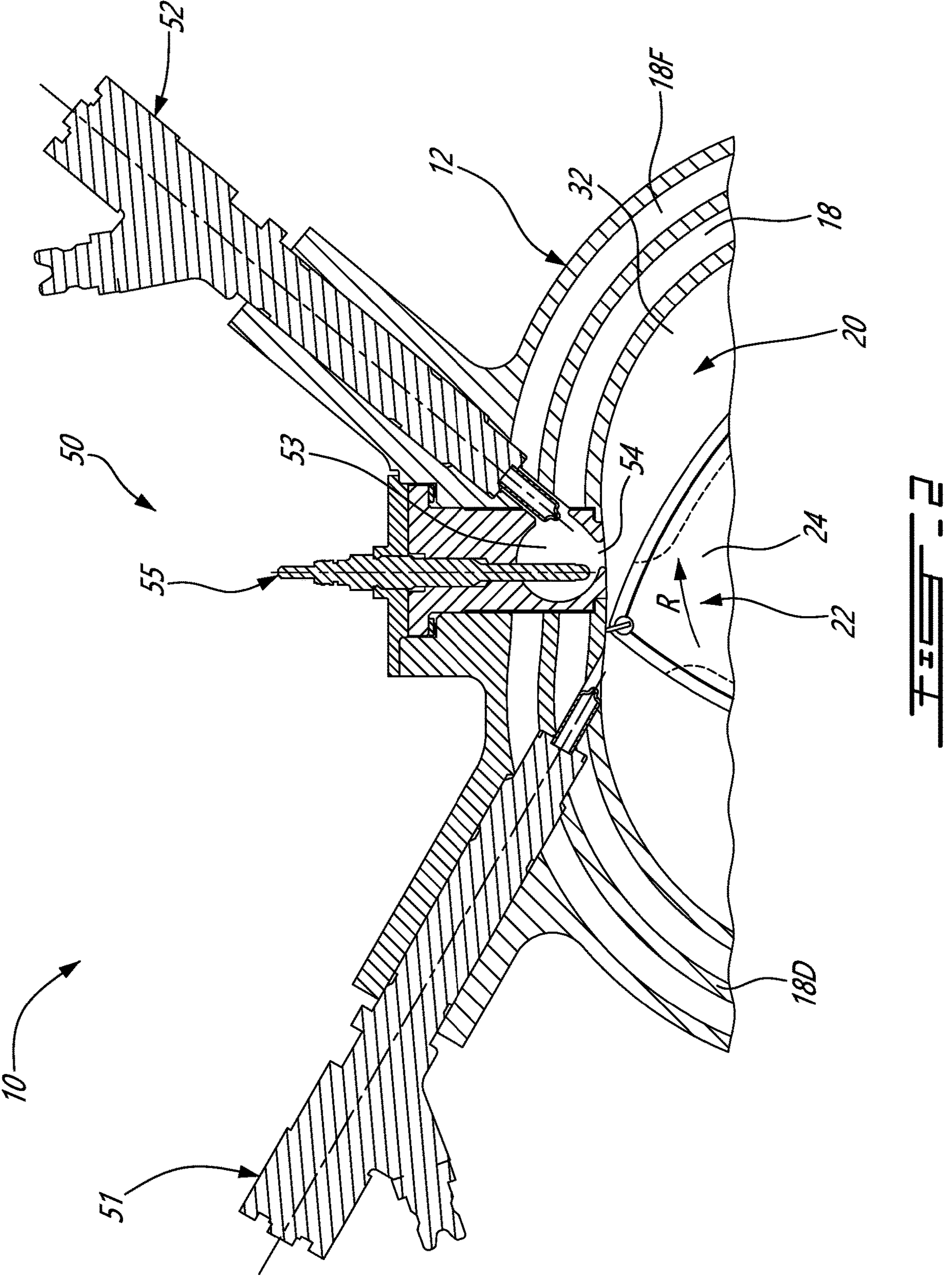
52
18F
12
32
18
20
50
53
54
55
24
R
22
10
18D
51

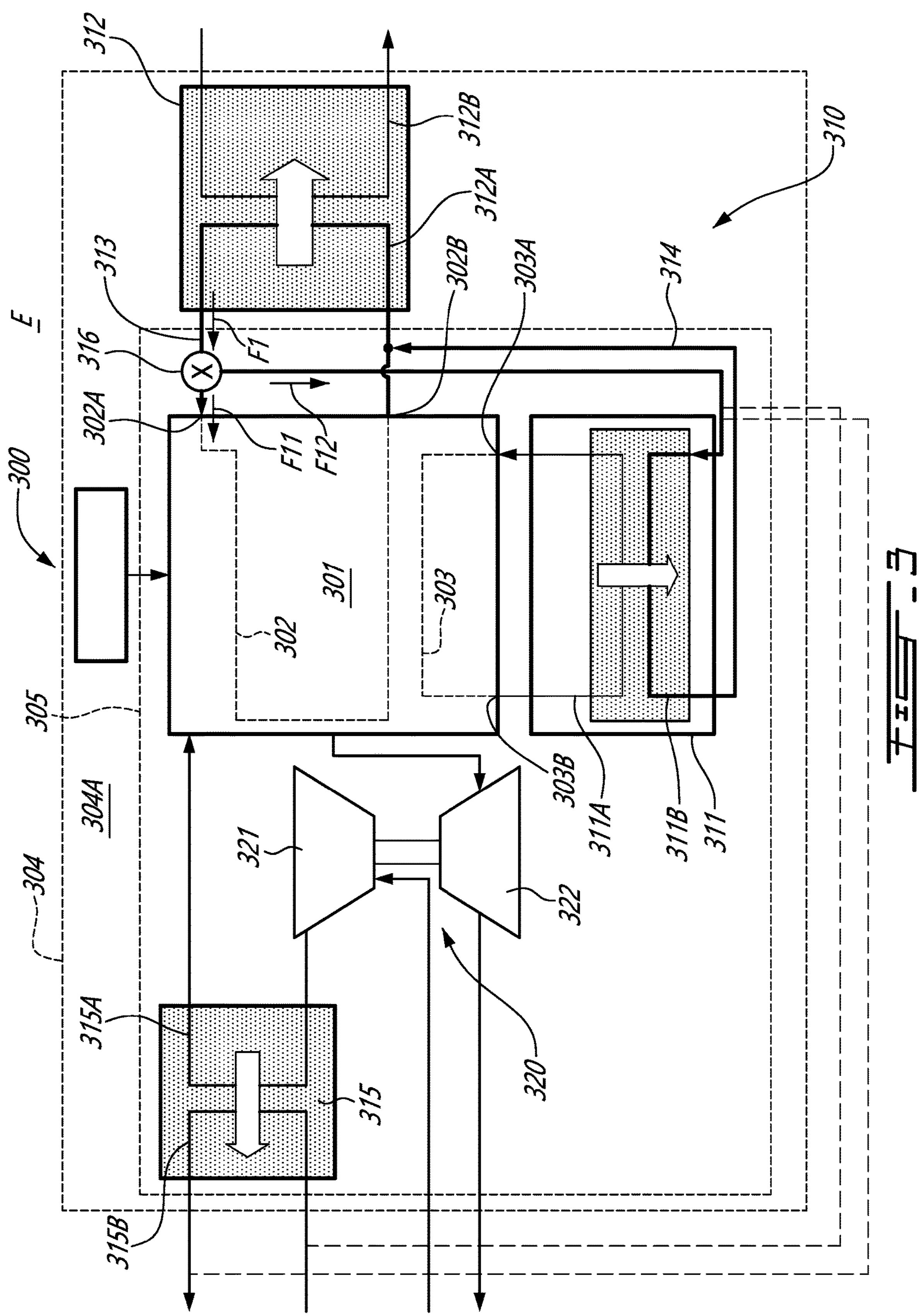
300
301
302
302A
302B
303
303A
303B
304
304A
305
310
311
311A
311B
312
312A
312B
313
314
315
315A
315B
316
320
321
322
F1
F11
F12
E 312
313
F1
F12
430A
430B
430
410
314
F11
400
301
311
315
320

312
510
312A
513
313
500
301
311B
311
315
320

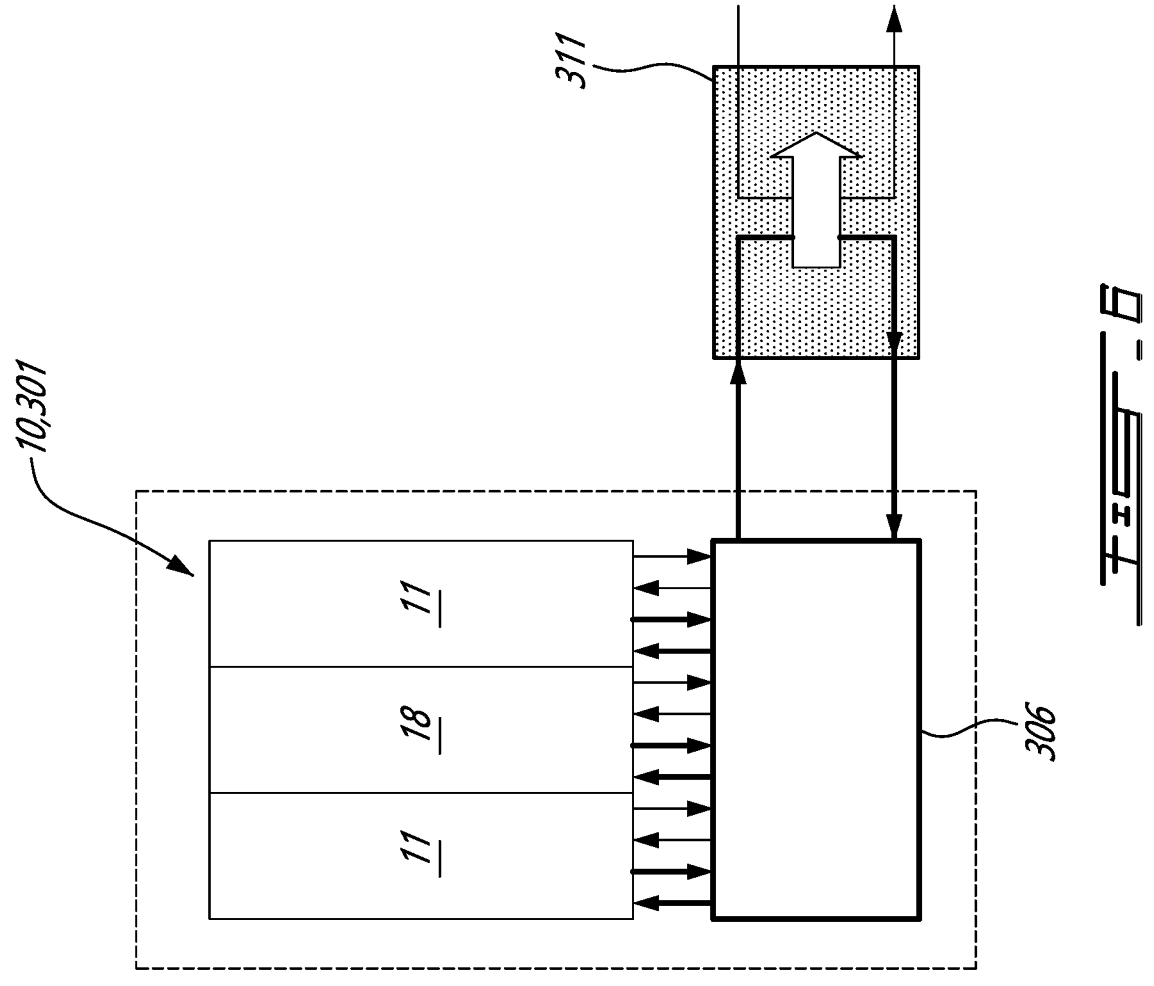
10,301
311
11
18
11
306

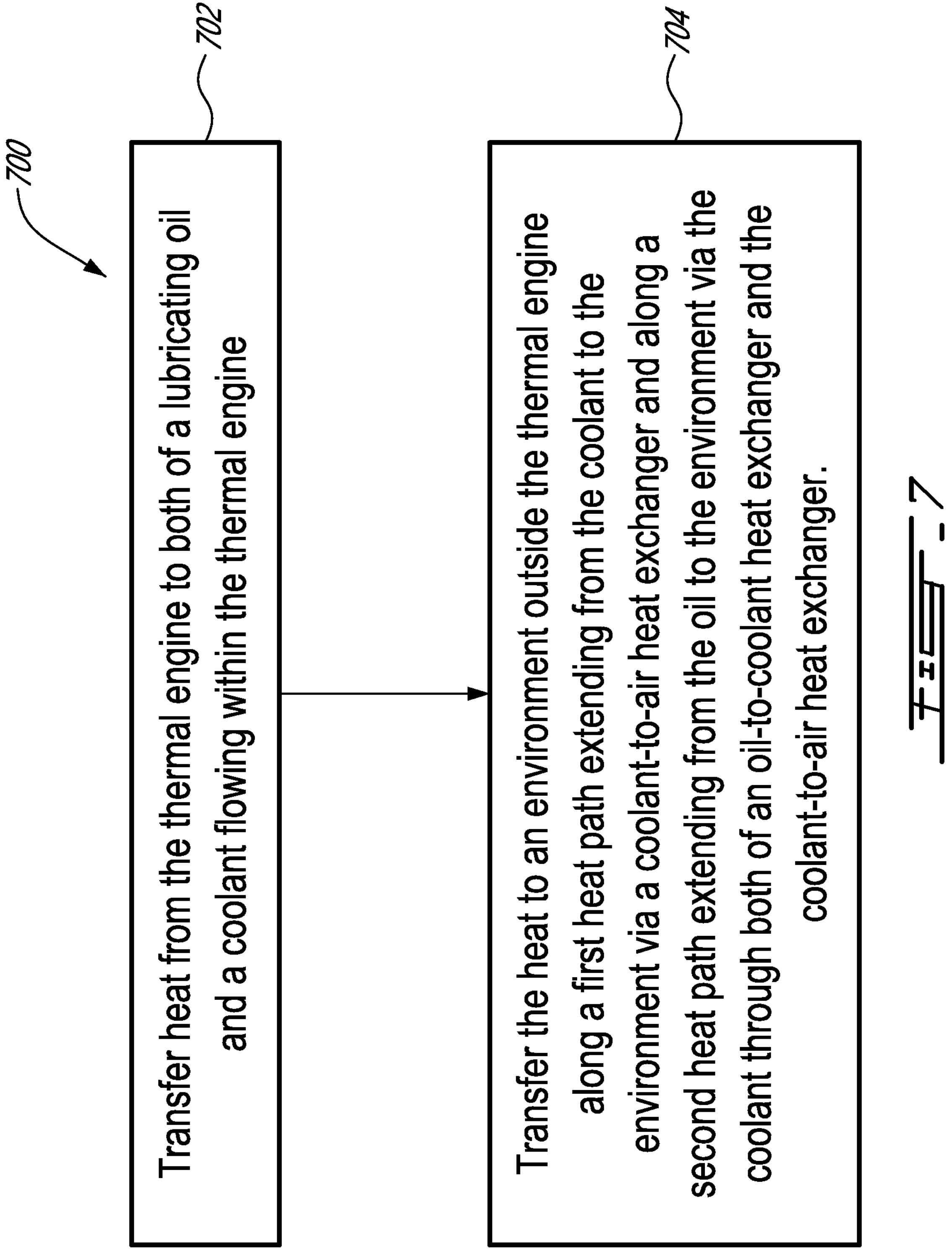
700
702
Transfer heat from the thermal engine to both of a lubricating oil and a coolant flowing within the thermal engine
704
Transfer the heat to an environment outside the thermal engine along a first heat path extending from the coolant to the environment via a coolant-to-air heat exchanger and along a second heat path extending from the oil to the environment via the coolant through both of an oil-to-coolant heat exchanger and the coolant-to-air heat exchanger.
FIG-7

AIRCRAFT POWER PLANT WITH HEAT MANAGEMENT SYSTEM

TECHNICAL FIELD

The application relates generally to internal combustion engines and, more particularly, to cooling systems of such engines.

BACKGROUND

Combustion chambers of thermal engines, such as a Wankel engine, are delimited radially by the rotor and rotor housing and axially by side or intermediate housings. The side housing faces the combustion chambers and is thus subjected to high pressure and thermal loads. On the other hand, the side housing provides the running surface for the rotor's side seals. During use, the rotor housing becomes hot and requires cooling. Existing cooling systems may require intricate sealing arrangements between adjacent rotor and side housings to prevent leakage. Continuous improvements are sought.

SUMMARY

In one aspect, there is provided an aircraft power plant, comprising: a thermal engine having a combustion chamber of varying volume inside a housing, the housing defining a coolant passage having a coolant passage inlet and a coolant passage outlet, and an oil passage; and a heat management system including: an oil-to-coolant heat exchanger having an oil conduit in fluid communication with the oil passage and a first coolant conduit in heat exchange relationship with the oil conduit and in fluid communication with the coolant passage; and a coolant-to-air heat exchanger having a second coolant conduit in fluid communication with the coolant passage and an air conduit in heat exchange relationship with the second coolant conduit and in fluid communication with an environment outside the aircraft power plant, wherein the coolant passage inlet and the coolant passage outlet of the coolant passage of the housing are fluidly connected to one another via the first coolant conduit of the oil-to-coolant heat exchanger and the second coolant conduit of the coolant-to-air heat exchanger.

The aircraft power plant described above may include any of the following features, in any combinations.

In some embodiments, the heat management system is devoid of an oil-to-air heat exchanger.

In some embodiments, the aircraft power plant has an engine nacelle, the thermal engine is enclosed within a fire-proof enclosure located within the engine nacelle, the oil-to-coolant heat exchanger located within the fire-proof enclosure.

In some embodiments, the coolant-to-air heat exchanger is located within the engine nacelle and outside the fire-proof enclosure.

In some embodiments, the aircraft power plant includes: a first coolant loop extending to and from the thermal engine and through the coolant-to-air heat exchanger; and a second coolant loop extending to and from the first coolant loop and through the oil-to-coolant heat exchanger.

In some embodiments, a coolant pre-cooler facilitates heat exchange between the coolant and the environment.

In some embodiments, the second coolant loop extends through the coolant pre-cooler.

In some embodiments, a single coolant loop extends in series from the thermal engine, through the coolant-to-air heat exchanger, through the oil-to-coolant heat exchanger, and to the thermal engine.

In some embodiments, a turbocharger has a compressor drivingly engaged by a turbine, the turbine fluidly connected to an exhaust of the thermal engine, and an intercooler facilitating heat exchange between the coolant and compressed air exiting the compressor, the first coolant loop or the second coolant loop extending through the intercooler.

In some embodiments, the thermal engine is a rotary engine having housings secured to one another and including a first side housing, a second side housing, and a rotor housing disposed between the first side housing and the second side housing, the coolant passage including a plurality of coolant passages each extending within a respective one of the housings, a coolant manifold fluidly connected to the coolant-to-air heat exchanger, the plurality of coolant passages connected in parallel to the coolant manifold.

In another aspect, there is provided a method of mitigating heat generation in a thermal engine, comprising: transferring heat from the thermal engine to both of a lubricating oil and a coolant flowing within the thermal engine; and transferring the heat to an environment outside the thermal engine along: a first heat path extending from the coolant to the environment via a coolant-to-air heat exchanger; and a second heat path extending from the oil to the environment via the coolant through both of an oil-to-coolant heat exchanger and the coolant-to-air heat exchanger.

The method described above may include any of the following features, in any combinations.

In some embodiments, the thermal engine is located within a fire-proof enclosure contained within an engine nacelle, the transferring of the heat along the first heat path includes transferring the heat to the environment via the coolant-to-air heat exchanger located within the engine nacelle and outside the fire-proof enclosure.

In some embodiments, the transferring of the heat along the second heat path includes transferring the heat from the oil to the coolant via the oil-to-coolant heat exchanger located within the fire-proof enclosure.

In some embodiments, the transferring of the heat along the first heat path and the transferring of the heat along the second heat path are performed via a first coolant loop extending through the coolant-to-air heat exchanger and via a second coolant loop extending through the oil-to-coolant heat exchanger.

In some embodiments, the method comprises pre-cooling the coolant before the transferring of the heat along the second heat path through the oil-to-coolant heat exchanger.

In some embodiments, the transferring of the heat along the first heat path and the transferring of the heat along the second heat path are preformed in series via a single coolant loop extending through both of the coolant-to-air heat exchanger and the oil-to-coolant heat exchanger.

In some embodiments, the method comprises: compressing air with a compressor before feeding the air to the thermal engine, and cooling the air downstream of the compressor with an intercooler, the intercooler providing heat exchange relationship between the coolant and the air downstream of the compressor.

In yet another aspect, there is provided an aircraft power plant, comprising: a rotary internal combustion engine having a combustion chamber of varying volume, the rotary internal combustion engine having housings defining respective coolant passages and defining an oil passage for lubrication; and a heat management system, having: an oil-to-coolant heat exchanger having an oil conduit in fluid communication with the oil passage and a first coolant conduit in heat exchange relationship with the oil conduit and in fluid communication with the coolant passages; and a coolant-to-air heat exchanger having a second coolant conduit in fluid communication with the coolant passages and an air conduit in heat exchange relationship with the second coolant conduit and in fluid communication with an environment outside the aircraft power plant, the respective coolant passages fluidly connected in parallel to the second coolant conduit, wherein the heat management system defines a heat transfer path from oil flowing through the oil passage to the environment via a coolant flowing through the coolant-to-air heat exchanger.

The aircraft power plant described above may include any of the following features, in any combinations.

In some embodiments, the aircraft power plant includes an engine nacelle, the rotary internal combustion engine is enclosed within a fire-proof enclosure located within the engine nacelle, the oil-to-coolant heat exchanger located within the fire-proof enclosure.

In some embodiments, the coolant-to-air heat exchanger is located within the engine nacelle and outside the fire-proof enclosure.

DESCRIPTION OF THE DRAWINGS

Reference is now made to the accompanying figures in which:

FIG. 2 is a cross-sectional view of a portion of the rotor housing of FIG. 1B for the rotary internal combustion engine of FIG. 1A illustrating a pilot subchamber and an injection system thereof;

FIG. 3 is a schematic view of an aircraft power plant with a heat management system in accordance with one embodiment;

FIG. 6 is a schematic view of a possible implementation of a thermal engine as a rotary engine for any of the aircraft power plant of FIGS. 3-5; and FIG. 7 is a flowchart illustrating steps of a method of mitigating heat generation of a thermal engine.

DETAILED DESCRIPTION

Figure 1A:
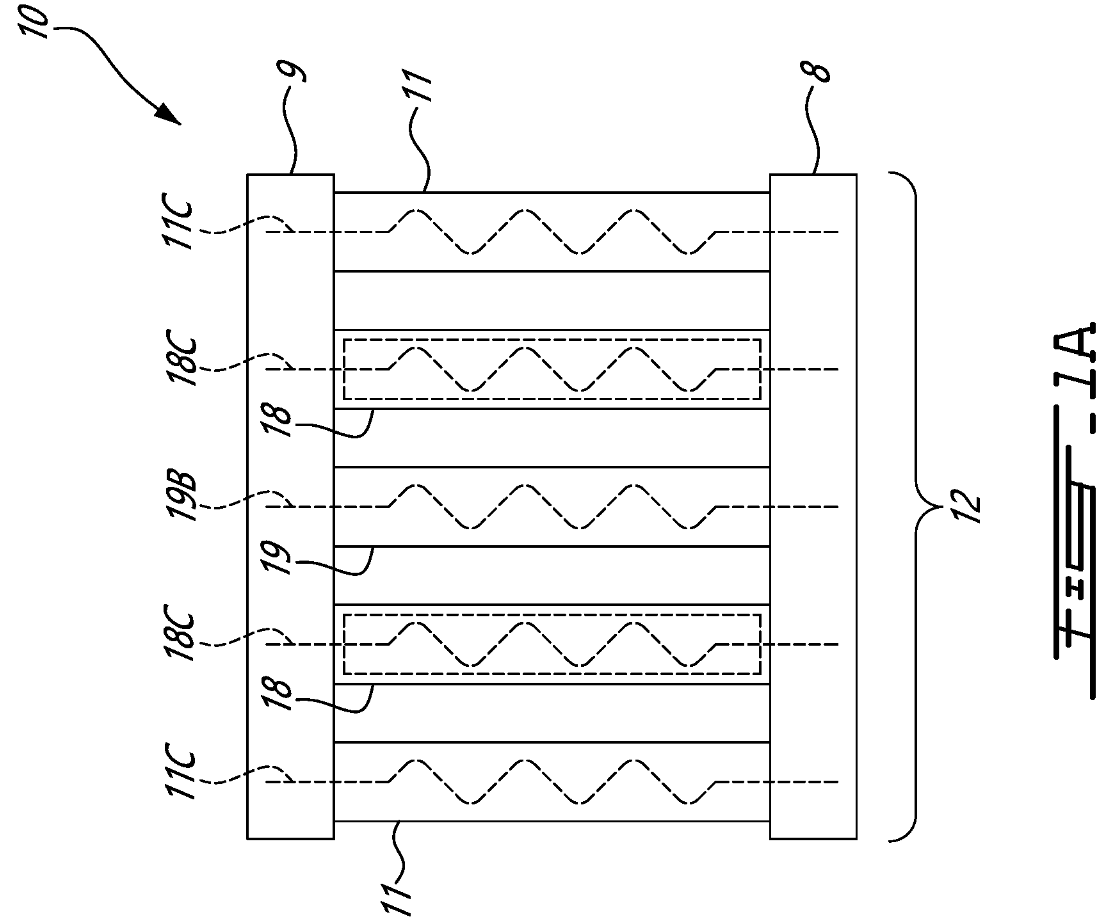
FIG. 1A is a schematic side assembly view of a rotary internal combustion engine in accordance with one embodiment.

Referring now to FIG. 1A, a motor assembly including a plurality of power modules each being operable to generate a force (e.g., torque) is shown. The power modules may be thermal engine modules, electric power modules, and any combinations of the above. In the depicted embodiment, the motor assembly includes a plurality of thermal engine modules that are each rotary engines. Hence, the motor assembly of the present disclosure corresponds to a multi-rotor internal combustion engine, referred to below simply as a rotary engine 10. The thermal engine modules may be, alternatively, piston engine or any kind of reciprocating internal combustion engine having at least one combustion chamber of varying volume. The rotary engine 10 is depicted in FIG. 1A as including two rotors, but may include more than two rotors or only one rotor in alternate embodiments. Each of the rotor and respective housings enclosing the rotor may be considered a power module. Hence, in FIG. 1A, the rotary engine 10 includes two power modules, but more or less may be used. The rotary engine 10 may be a Wankel engine. The rotary engine 10 comprises an outer body also referred to as a housing assembly 12 including a stack of housings. The stack of housings includes axially-spaced side housings 11, which each may include a side wall 11A (FIG. 1C) and a side plate 11B (FIG. 1B) mounted to the side wall 11A, with a rotor housing 18 extending from one of the side housings 11 to the other (for a single rotor engine), to form a rotor cavity 20. The side plate 11B may define the face against which the rotor rides during use whereas the side wall 11A may be used to hold the side plate 11B and is mounted to the rotor housing 18. More detail about this configuration may be found in U.S. patent application Ser. No. 18/054,701, the entire contends of which are incorporated by reference herein. In some alternate embodiments, the side housings 11 include solely the side wall, that is, the side wall and the side plate may be combined into a single element.

In the depicted embodiment, the outer body 12 further includes an intermediate housing 19 and the rotor housing 18 includes two rotor housings. Each of the rotor housings 18 is disposed between a respective one of the side housings 11 and the intermediate housing 19. Put differently, the rotor housing 18 includes a first rotor housing and a second rotor housing. The first rotor housing is disposed between a first one of the side housings 11 and the intermediate housing 19. The second rotor housing disposed between a second one of the side housings 11 and the intermediate housing 19. Regardless of a number of rotors, the rotary engine includes only two side housings disposed at opposite ends of the engine. A number of the intermediate housing 19 equals a number of the rotor minus 1 (e.g., one intermediate housing for a two-rotor engine, two intermediate housings for a three-rotor engine, and so on). The different housings are clamped in sandwich.

The side housings 11, the intermediate housing 19, and the rotor housings 18 conjointly define rotor cavities 20 (FIG. 2) each receiving a respective rotor 22. The intermediate housing 19 therefore defines opposite axial end faces that are each engaged by a respective one of the rotors 22. The intermediate housing 19 may include an intermediate wall 19A (FIG. 1C) and two intermediate plates secured on opposite sides of the intermediate wall. The intermediate plates may define the faces against which the rotors ride during use. The intermediate wall 19A is secured to the rotor housings disposed on opposite sides thereof.

Still referring to FIG. 1A, the rotor housings 18 have each a first side and a second side opposite to the first side. The side housings 11 include a first side housing secured to the first side of a first one of the rotor housings 18 and a second side housing secured to the second side of a second one of the rotor housings 18. The rotor cavities 20 are defined axially between the side housings 11 and the intermediate housing 19 and circumscribed by the rotor housings 18.

Figure 1B:
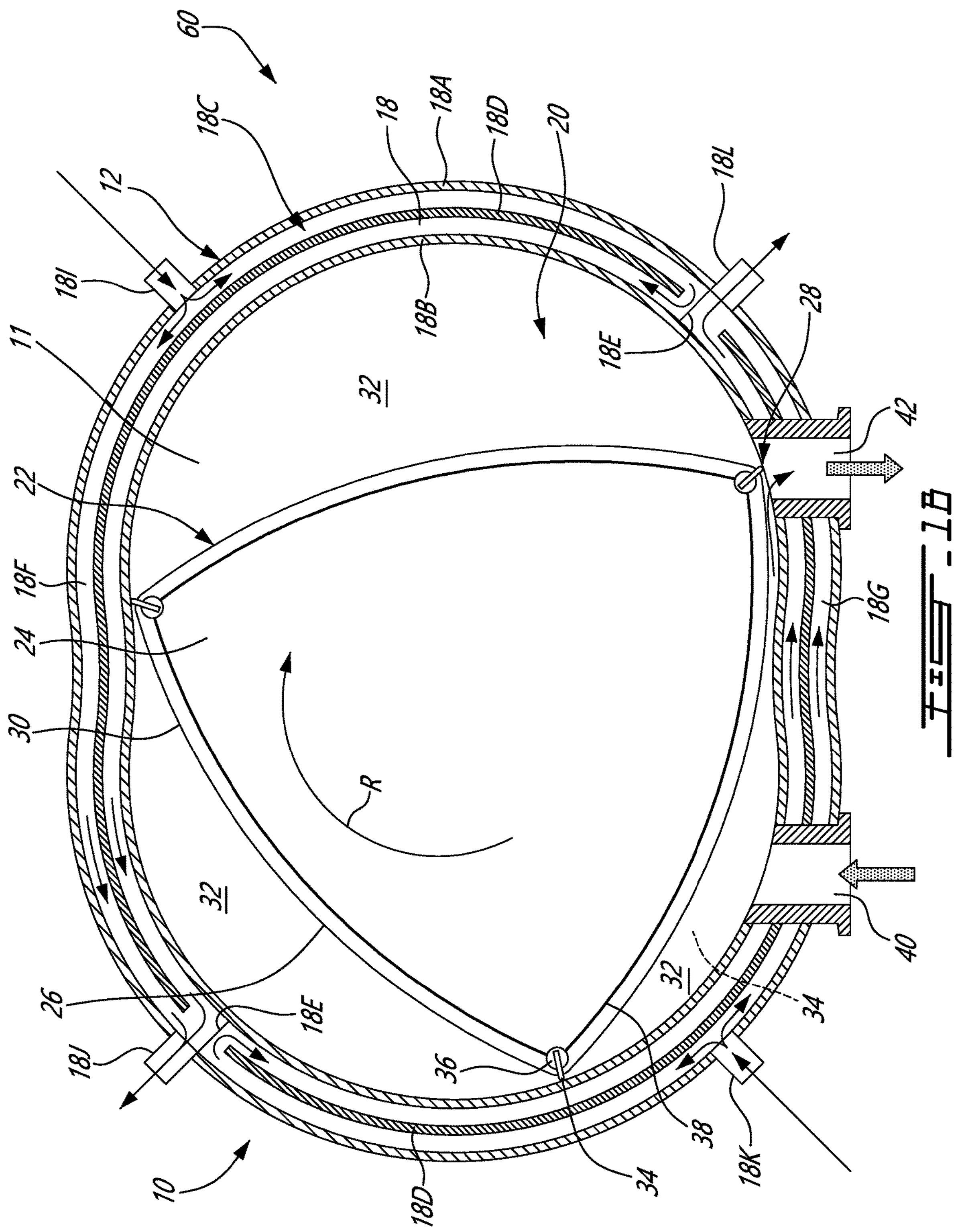
FIG. 1B is a schematic cross-sectional view of a rotor housing in accordance with one embodiment to be used with the rotary internal combustion engine of FIG. 1A.

Referring now to FIG. 1B, the rotor housing 18 and rotor 22 are described in greater detail. The rotor housing 18 has an inner surface having a profile defining two lobes, which may be an epitrochoid. An inner body or rotor 22 is received within one of the rotor cavities 20. The rotor 22 has axially spaced end faces 24 adjacent to the side walls 14, and a peripheral face 26 extending there between. The peripheral face 26 defines three circumferentially-spaced apex portions 28, and a generally triangular profile with outwardly arched sides 30. The apex portions 28 are in sealing engagement with the inner surface of rotor housing 18 to form three rotating combustion chambers 32 between the rotor 22 and housing assembly 12. The combustion chambers 32 vary in volume with rotation of the rotor 22 within the housing assembly 12. The geometrical axis of the rotor 22 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 28 has an apex seal 34 extending from one end face 24 to the other and biased radially outwardly against the rotor housing 18. An end seal 36 engages each end of each apex seal 34 and is biased against the respective side housing 11. Each end face 24 of the rotor 22 has at least one arc-shaped face seal 38 running from each apex portion 28 to each adjacent apex portion 28, adjacent to but inwardly of the rotor periphery throughout its length, in sealing engagement with the end seal 36 adjacent each end thereof and biased into sealing engagement with the adjacent side housings 11. Alternate sealing arrangements are also possible.

Although not shown in the Figures, the rotor 22 is journaled on an eccentric portion of a shaft such that the shaft rotates the rotor 22 to perform orbital revolutions within the rotor cavity 20. The shaft may rotate three times for each complete rotation of the rotor 22 as it moves around the rotor cavity 20. Oil seals are provided around the eccentric to impede leakage flow of lubricating oil radially outwardly thereof between the respective rotor end face 24 and side housings 11. During each rotation of the rotor 22, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 42 In the embodiment shown, the ports 40, 42 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary unit 10 operates under the principle of the Miller or Atkinson cycle, with its compression ratio lower than its expansion ratio, through appropriate relative location of the primary inlet port 40 and exhaust port 42.

Referring to FIG. 2, the rotary unit 10 includes a fuel injection system 50 having a main injector 51 and a pilot injector 52. The rotor housing 18 defines a pilot subchamber 53, which may be provided in an insert or defined directly by the rotor housing 18. The pilot subchamber 53 is located radially outwardly of an inner face of the rotor housing 118 against which the rotor 22 rides during use. The pilot subchamber 53 is in communication with the rotor cavity 20. In the embodiment shown, the pilot subchamber 53 has a circular cross-section; alternate shapes are also possible. The pilot subchamber 53 communicates with the rotor cavity 20 through at least one opening or outlet 54, and has a shape forming a reduced cross-section adjacent the opening outlet 54, such that the outlet 54 defines a restriction to the flow between the pilot subchamber 53 and the rotor cavity 20. The outlet 54 may have various shapes and/or be defined by multiple holes. An igniter 55 may have its tip located within the pilot subchamber 53 to ignite a mixture of fuel and air received therein. Understandably, this section of the rotor housing 18 may be come hotter than a remainder of the rotor housing since the combustion of the fuel received into the pilot subchamber 53 via the pilot injector 52 will generate heat. Moreover, the combustion of the fuel received into the main chamber 32 independently of the pilot subchamber 53 via the main injector 51 will also generate heat. This may, in turn, cause a non-uniformity of the heat distribution in the rotor housing 18. In some alternate embodiments, the pilot subchamber 53 may be omitted.

Typically, rotary engines are cooled by coolant passages that extend from one housing to the next in an axial direction relative to an axis of rotation of a shaft driven by the rotors. This may require complex sealing arrangements between the different housings (e.g., side housings 11, rotor housings 18, intermediate housings 19). Moreover, the side housing 11 located at the end of the loop is less cooled since the coolant has already picked up heat from the upstream housings. Moreover, in some configurations, it may be desired to vary the quantity of coolant flown in the coolant passage to increase or decrease the cooling of the housing(s). The cooling systems disclosed below may at least partially alleviate these drawbacks.

Referring back to FIG. 1B, the rotor housing 18 has an outer wall 18A and an inner wall 18B spaced apart from the outer wall 18A to define a rotor housing coolant passage 18C therebetween. The rotor housing coolant passage 18C extends through the rotor housing 18. The rotor housing coolant passage 18C extends at least partially around the rotor 22 and around the rotor cavity 20 and may extend fully around the rotor 22 and rotor cavity 20. Both of the outer wall 18A and the inner wall 18B extend around the rotor cavity 20 and extend axially from one of the side housing to the other. The inner wall 18B defines an inner face against which the rotor rides during use. The rotor housing 18 may include peripheral inner walls 18D and radial inner walls 18E to divide the rotor housing coolant passage 18C in two or more sections. In the embodiment shown, the rotor housing coolant passage 18C includes a first section 18F and a second section 18G spaced apart from the first section 18F. The two sections may be circumferentially and/or radially offset from one another. The rotor housing coolant passage 18C includes a peripheral coolant inlet 181 and a peripheral coolant outlet 18J. It may include a secondary peripheral coolant inlet 18K and a secondary peripheral coolant outlet 18L when the rotor housing coolant passage 18C has two sections as disclosed herein. It will be appreciated that the rotor housing 18 may define a coolant port, a coolant inlet, and a coolant outlet; the coolant port being either an inlet or an outlet. In such an embodiment, the first section fluidly connects the coolant inlet to the coolant port and the second section fluidly connects the coolant outlet to the coolant port. Hence, only one coolant inlet and two coolant outlets, or only one coolant outlet and two coolant inlets may be provided. Any suitable configurations and any number of coolant sections are contemplated.

Figure 1C:
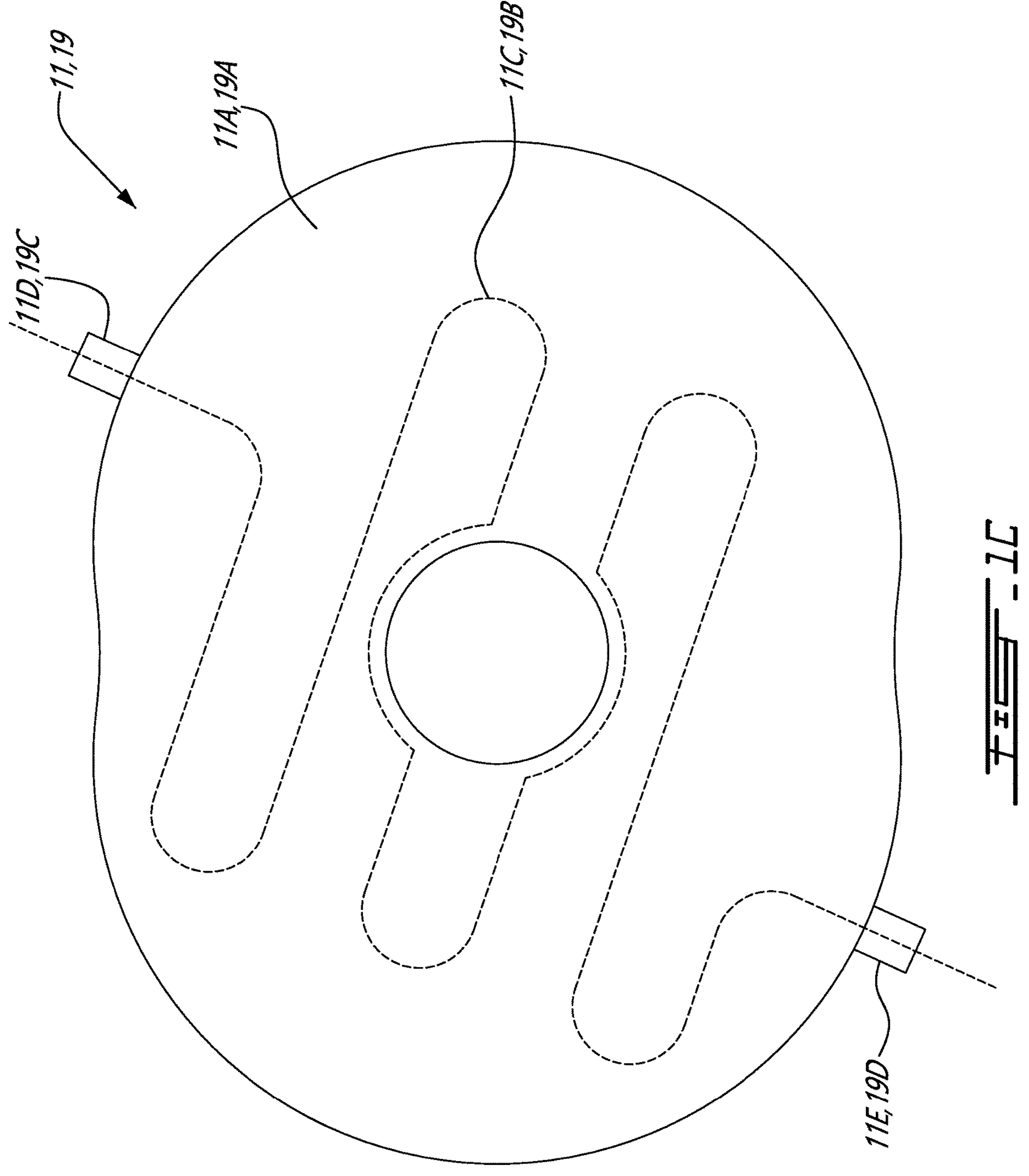
FIG. 1C is a schematic cross-sectional view of a side housing or of an intermediate housing in accordance with one embodiment to be used with the rotary internal combustion engine of FIG. 1A.

Referring now to FIG. 1C, the side housing 11, and more particularly the side wall 11A is shown. The side wall 11A is located at an end of the rotary engine 10 and is secured to the rotor housing 18. In the depicted embodiment, the side wall 11A defines a side housing coolant passage 11C extending from a side housing coolant passage inlet 11D to a side housing coolant passage outlet 11E. The side housing coolant passage 11C may extend around a plurality of internal walls such as to have a tortuous shape to maximize heat transfer from the side wall 11A to the coolant. The side housing 11 and intermediate housing 19 define a central hole for receiving a shaft of the rotary engine 10.

Still referring to FIG. 1C, a similar configuration is provided for the intermediate housing 19 in which the intermediate wall 19A has an intermediate housing coolant passage 19B extending from an intermediate housing coolant passage inlet 19C to an intermediate housing coolant passage outlet 19D. A similar tortuous shape may be provided to maximize heat transfer to the coolant.

Referring back to FIG. 1A, in the embodiment shown, the side housing coolant passages 11C, the intermediate housing coolant passage 19B, and the rotor housing coolant passages 18C are fluidly separated from one another and are free of a seal between the intermediate housing 19 and the rotor housings 18 and between the rotor housings 18 and the side housings 11. In the presented embodiment, a parallel flow coolant circuit is defined by the outer body 12 and is operable to individually cool the different housings (e.g., side housings 11, rotor housings 18, intermediate housing 19). The expression "parallel" in the context of the present disclosure implies that each of the housings is simultaneously cooled via a dedicated flow of coolant. This dedicated flow of coolant, once it enters one of the housings, is not shared with the other housings. This is contrary to a configuration in "series" where the same flow of coolant cools each of the housings, one after the other. A configuration in series may case the coolant to pick up less and less heat as it flows through the different housings since its temperature increases as it flows through the different housings. More specifically, each of the side housing coolant passages 11C, the intermediate housing coolant passage 19B, and the rotor housing coolant passages 18C are fluidly independent and separated from one another as these coolant passages extend within the intermediate housing 19, the rotor housings 18, and the side housings 11. Thus, the coolant passages are free of inter-passage connection between the housings. Inter-passage connection corresponds to fluid connection from one of the housing to the other either via external conduits or via ports defined by the housings at the mounting interfaces. Hence, coolant that enters one of the side housings 11, the rotor housing 18, and the intermediate housing 19 exits the same one of the side housings 11, the rotor housing 18, and the intermediate housing 19. As discussed above, each of the side housings 11, the rotor housing 18, and the intermediate housing 19 has a respective dedicated inlet and a respective dedicated outlet. Thus, the coolant flows in parallel within each of the side housings 11, the rotor housing 18, and the intermediate housing 19 along respective flow paths from a respective inlet to a respective outlet without intersection between these flow paths. Therefore, a first coolant flow path extends solely within the first side housing, a second coolant flow path extends solely within the second side housing, and the rotor housing coolant flow path extends solely within the rotor housing. When an intermediate housing is used, an intermediate flow path extends solely within the intermediate housing. The coolant passages are therefore free from intersection with the mounting interfaces defined between the different housings. Put differently, there is no coolant flow connection across the housings.

It will be appreciated that, in some embodiments, the rotary engine 10 may not require three-piece housings. Hence, the rotary engine 10 includes at least one flow path per housing; the flow paths of different housing are free from interconnection from one another. In other words, the flow path(s) of each housing are fluidly independent from one another.

Consequently, there may be no sharing of coolant between the different housings. Each of the housings have dedicated inlets and outlets and the coolant passages of these housings are free of intersection with mounting interfaces defined between these housings. These mounting interfaces correspond to mating faces of the different housings. In other words, the side housing coolant passage 11C extends along a flow path that is free from intersection with an interface between the side housing 11 and the rotor housing 18. The rotor housing coolant passage 18C extends along a flow path that is free from intersection with an interface between the rotor housing 18 and the side housing 11 and free from intersection with an interface between the rotor housing 18 and the intermediate housing 19. The intermediate housing coolant passage 19B extends along a flow path that is free from intersection with interfaces between the intermediate housing 19 and both of the rotor housings 18 located on opposite sides thereof. The interfaces between the housings are free of coolant seal. A coolant seal is a seal (e.g., elastomeric member) used for preventing coolant leakage. A lubricant seal or a combustion gas seal may be disposed at interfaces between the housings to prevent leakage of lubricant or combustion gases, but there may be no seal used for preventing leakage of coolant at the interfaces between the housings. The configuration of the distinct fluidly independent coolant passages may render obsolete the use of coolant seal between the housings.

Still referring to FIG. 1A, the rotary engine 10 may include a fluid supply manifold 8 and a fluid outlet manifold 9. The fluid supply manifold 8 is used to receive a coolant from a source of coolant and to distributed this coolant between the different coolant passages 11C, 19B, 18C of the housings 11, 18, 19 of the rotary engine 10. The fluid outlet manifold 9 is used to receive the coolant from the different coolant passages and to flow the coolant back towards the source of coolant. As shown in FIG. 1A, a plurality of fluid conduits fluidly connect the fluid supply manifold 8 to the fluid outlet manifold 9. The plurality of fluid conduits are fluidly connect the fluid supply manifold 8 to the fluid outlet manifold 9 and are free from fluid interconnections fluidly between the fluid supply manifold 8 and the fluid outlet manifold 9. Each fluid conduit of the plurality of fluid conduits is defined in part by a power module of the plurality of power modules. These fluid conduits include the coolant passages 11C, 19B, 18C. The fluid conduits are free from fluid interconnections fluidly between the fluid supply manifold and the fluid outlet manifold. In the context of the present disclosure, a fluid conduit that connects a first component to a second component implies any combination of elements that convey a fluid from the first component to the second component, and is suitable for its stated purpose. For example, a fluid conduit connecting the first component to the second component may include any one or a combination of any one or more of: a filter, a pump, a valve, a pipe, a hose, a bore through a part of an engine block, etc. In the case of an electric power module, a coolant passage may extend within a housing of an electric motor.

Referring now to FIG. 3, an aircraft power plant in accordance with one embodiment is shown at 300. The aircraft power plant 300 includes a thermal engine 301, which may be an internal combustion engine such as a piston engine or a rotary engine, such as the rotary engine 10 described above with reference to FIG. 1A. The thermal engine 301 includes a combustion chamber of varying volume defined by a housing, for instance, collectively by the housings 11, 18, 19 of the rotary engine 10. The thermal engine 301 has a coolant passage 302 for flowing a coolant, such as water, ethylene-glycol, a mixture of water and alcohol, or any suitable liquid coolant known in the art and suitable for aerospace applications. The coolant passage 302 extends from a coolant inlet 302A of the thermal engine 301 to a coolant outlet 302B of the thermal engine 301.

The thermal engine 301 further has an oil passage 303 for flowing lubricant, such as oil or any other suitable lubricant. It will be appreciated that the oil passage 303 may not follow a restrictive flow path since it is injected at different locations within the thermal engine 301 for lubrication purposes. For instance, the oil may be injected proximate the different seals (see FIG. 1B described above). The oil is injected into the thermal engine 301 via an oil inlet 303A and may be scavenged and outputted out of the thermal engine 301 via an oil outlet 303B.

In an aircraft application, the aircraft power plant 300 may be located within an engine nacelle 304 defining an internal volume 304A sized for receiving the thermal engine 301. The thermal engine 301 may be enclosed within a fire-proof enclosure 305, also referred to as a fire zone, located within the internal volume 304A of the engine nacelle 304. In the context of the present disclosure, the expression "fire-proof" implies that walls of the fire-proof enclosure are designed in a manner to resist a flame of 1100 degrees Celsius for 15 minutes and follow typical power plant standards for certification known to regulatory authorities and field experts.

It may be desired to limit fluid lines, such as coolant or oil lines, extending through walls of the fire-proof enclosure 305. It may also be desired to limit length of those fluid lines to minimize risk of leakage, minimize weight, part counts, and so on. Moreover, transfer of flammable fluid, such as oil, over long distances, may be undesired for aerospace applications. These long lines may increase warm-up time, create congealing issues in heat exchangers, induce imbalances heat management, and so on.

Still referring to FIG. 3, the aircraft power plant 300 has a heat management system 310 that may at least partially alleviate the afore-mentioned drawbacks. The heat management system 310 is configured for dissipating heat generated by the thermal engine 301 to an environment E outside the thermal engine 301 and outside the nacelle 304. More specifically, the heat management system 310 includes an oil-to-coolant heat exchanger 311 and a coolant-to-air heat exchanger 312. The oil-to-coolant heat exchanger 311 facilitates heat exchange between an oil flow and a coolant flow. The oil-to coolant heat exchanger 311 has an oil conduit 311A in fluid communication with the oil passage 303 and a first coolant conduit 311B in heat exchange relationship with the oil conduit 311A and in fluid communication with the coolant passage 302. The coolant-to-air heat exchanger 312 facilitates heat exchange between a coolant flow and ambient air of the environment E. The coolant-to-air heat exchanger 312 has a second coolant conduit 312A in fluid communication with the coolant passage 302 and an air conduit 312B in heat exchange relationship with the second coolant conduit 312A and in fluid communication with the environment E for receiving cooling air therein.

In the context of the present disclosure, the expression "conduit" implies any fluid lines, connectors, and so on used to delimit a passage within which a fluid flows. In the heat exchanger, the "conduit" may be a plurality of conduits of different shapes configured to maximize heat transfer.

In the depicted embodiment, the heat management system 310 defines a heat transfer path from oil flowing through the oil passage 303 to the environment E outside the aircraft power plant 300 via a coolant flowing through the oil-to-coolant heat exchanger 311 and via the coolant flowing through the coolant-to-air heat exchanger 312. Put differently, heat is first transferred from the oil to the coolant such that a heated coolant exits the oil-to-coolant heat exchanger 311, and heat is second transferred from the heated coolant to the ambient air of the environment E via the coolant-to-air heat exchanger 312. Therefore, the heat generated by the thermal engine 301 and transferred to the oil is dissipated to the environment E via the coolant. The heat management system 310 may thus be devoid of an oil-to-air heat exchanger. In other words, heat dissipation of the oil may rely on the coolant. The cooling of the oil may be done in serial rather than in parallel. Stated differently, in this embodiment, heat is not expelled from the oil directly to the environment. This heat is transferred to an intermediary medium, which is the coolant in the present disclosure.

In the embodiment shown, the oil-to-coolant heat exchanger 311 is located within the fire-proof enclosure 305 while the coolant-to-air heat exchanger 312 is located within the engine nacelle 304, but outside the fire-proof enclosure 305. Hence, fluid lines crossing a wall of the fire-proof enclosure 305 are minimized. It will be appreciated that the inventors of the present disclosure discovered that the present configuration may increase overall efficiency of an aircraft equipped with the aircraft power plant albeit a reduction in a thermodynamic efficiency of the heat transfer from the different fluids (e.g., oil, coolant) to the ambient air. Indeed, the reduction in part counts, long fluid lines, and weight reduction resulting from having only one fluid-to-air heat exchanger, which are known to be heavy and bulky, rather than two may compensate for the efficiency loss in heat transfer to ambient air. The disclosed configuration may therefore counterintuitively increase efficiency of an aircraft equipped with the aircraft power plant 300.

Still referring to FIG. 3, the heat management system 310 includes two coolant loops, namely, a first coolant loop 313 extending to and from the thermal engine 301 and through the coolant-to-air heat exchanger 312; and a second coolant loop 314 extending to and from the first coolant loop 313 and through the oil-to-coolant heat exchanger 311. The first coolant loop 313 includes the coolant passage 302 of the thermal engine 301, the second coolant conduit 312A of the coolant-to-air heat exchanger 312, and coolant lines fluidly connecting the coolant inlet 302A and the coolant outlet 302B of the coolant passage 302 to the second coolant conduit 312A of the coolant-to-air heat exchanger 312. The second coolant loop 314 includes the first coolant conduit 311B of the oil-to-coolant heat exchanger 311 and fluid lines fluidly connecting an inlet and an outlet of the first coolant conduit 311B to the first coolant loop 313.

In the present embodiment, a first coolant flow F1 exiting the coolant-to-air heat exchanger 312 after having been cooled down via heat exchange with the ambient air is flown towards the coolant inlet 302A of the coolant passage 302 of the thermal engine 301. The first coolant flow F1 is divided in to a first sub-flow F11 and a second sub-flow F12. The first sub-flow F11 flows into the coolant passage 302 from the coolant inlet 302A to the coolant outlet 302B. The second sub-flow F12 flows into the second coolant loop 314 and into the first coolant conduit 311B of the oil-to-coolant heat exchanger 311. The first sub-flow F11 and the second sub-flow F12 are rejoined such that they both flow into the second coolant conduit 312A of the coolant-to-air heat exchanger 312. Therefore, the first sub-flow F11 picks-up heat from the housing of the thermal engine 301 whereas the second sub-flow F12 picks-up heat from the oil. The heat is then expelled to the ambient air via the coolant-to-air heat exchanger 312.

A valve 316 may be used to split the coolant flow F1 in to the two sub-flows F11, F12. The valve 316 may be controlled by a controller to select the appropriate split (e.g., 40%-60%) between the two sub-flows. The valve 316 may be located within the fire zone to limit the amount of pipping crossing walls of the fire-proof enclosure 305.

Still referring to FIG. 3, in the present embodiment, the aircraft power plant 300 includes a turbocharger 320 having a compressor 321 drivingly engaged by a turbine 322. The turbine 322 is fluidly connected to an exhaust of the thermal engine 301. It will be appreciated that the compressor 321 may alternatively, or in combination, be driven by an electric motor and/or by the thermal engine 301. In some embodiments, the turbine 322 may be drivingly engaged to a shaft of the thermal engine 301 such that the turbine 322 and the thermal engine 302 compound their power in driving a rotatable load, such as a propeller. In some cases, it may be required to cool down compressed air exiting the compressor 321 since a temperature of the air may be too high for a material (e.g., aluminum) of the housing of the thermal engine 301.

Thus, in the present embodiment, the heat management system 310 includes an intercooler 315 facilitating heat exchange between the environment E and compressed air exiting the compressor 321. The intercooler 315 may be an air-to-air heat exchanger or an air-to-coolant heat exchanger. The intercooler 315 has an air conduit 315A having an inlet fluidly connected to an outlet of the compressor 321 and an outlet fluidly connected to an intake of the thermal engine 301. The intercooler 315 has a fluid conduit 315B for flowing either ambient air or the coolant. If the fluid conduit 315B flows the coolant, fluid lines, depicted in dashed lines in FIG. 3, may be used to fluidly connect the fluid conduit 315B of the intercooler 315 to the second coolant loop 314 of coolant. Alternatively, the fluid conduit 315B may stem from the first coolant loop 313 instead of from the second coolant loop 314. Put differently, either the first or the second coolant loop may extend through the intercooler 315. Using an air-to-coolant heat exchanger may be beneficial since it may be lighter and of smaller dimensions than an air-to-air heat exchanger for the same cooling requirement. It may be easier to position the air-to-coolant heat exchanger in the vicinity of the thermal engine 301 than an air-to-air heat exchanger. Response time to variation of temperature may be reduced with air-to-coolant heat exchanger.

Figure 4:
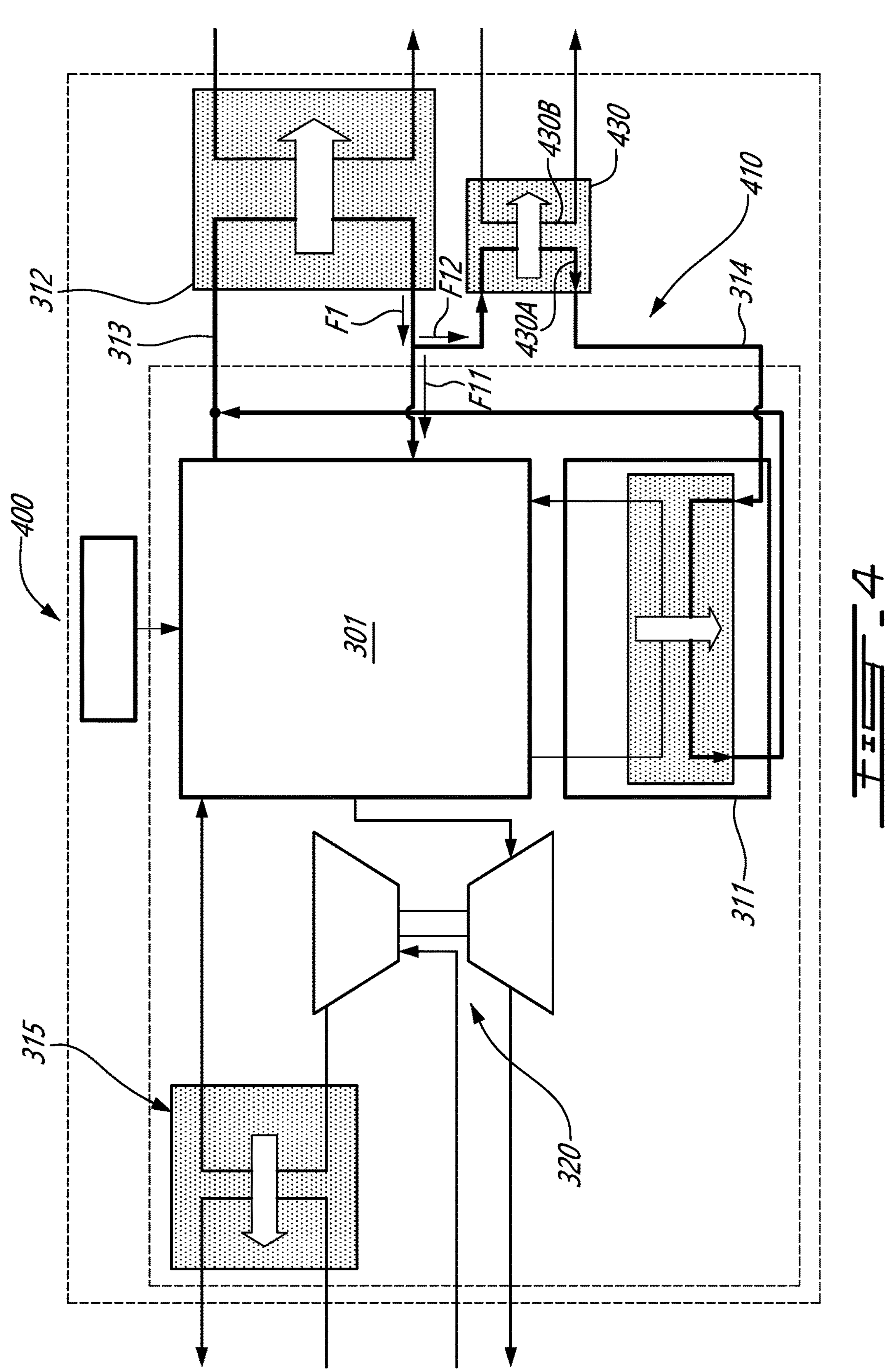
FIG. 4 is a schematic view of an aircraft power plant with a heat management system in accordance with another embodiment.

Referring now to FIG. 4, another embodiment of an aircraft power plant is shown at 400. For the sake of conciseness, only features differing from the aircraft power plant 300 described above with reference to FIG. 3 will be described herein below.

In the depicted embodiment, the aircraft power plant 400 includes a heat management system 410 similar to the heat management system 310 of FIG. 3, but that further includes a coolant pre-cooler 430. The coolant pre-cooler 430 includes a coolant conduit 430A and an air conduit 430B in heat exchange relationship with the coolant conduit 430A. In the embodiment shown, the coolant conduit 430A stems from the first coolant loop 313. The coolant pre-cooler 430 may be located upstream of the oil-to-coolant heat exchanger 311. More specifically, the second sub-flow F12, instead of flowing directly through the oil-to-coolant heat exchanger 311, flows through the coolant pre-cooler 430 to lower its temperature before flowing through the oil-to-coolant heat exchanger 311. Stated differently, a portion of the coolant flow exiting the coolant-to-air heat exchanger 312 towards the thermal engine 301 may be diverted away from the thermal engine 301 to flow through the coolant pre-cooler before flowing through the oil-to-coolant heat exchanger 311. Therefore, in this configuration, a temperature of the coolant flowing through the oil-to-coolant heat exchanger may be lower than that of the heat management system 310 of FIG. 3, which is devoid of such a coolant pre-cooler. Thus, in this configuration, the second coolant loop 314 extends through the coolant pre-cooler 430.

Figure 5:
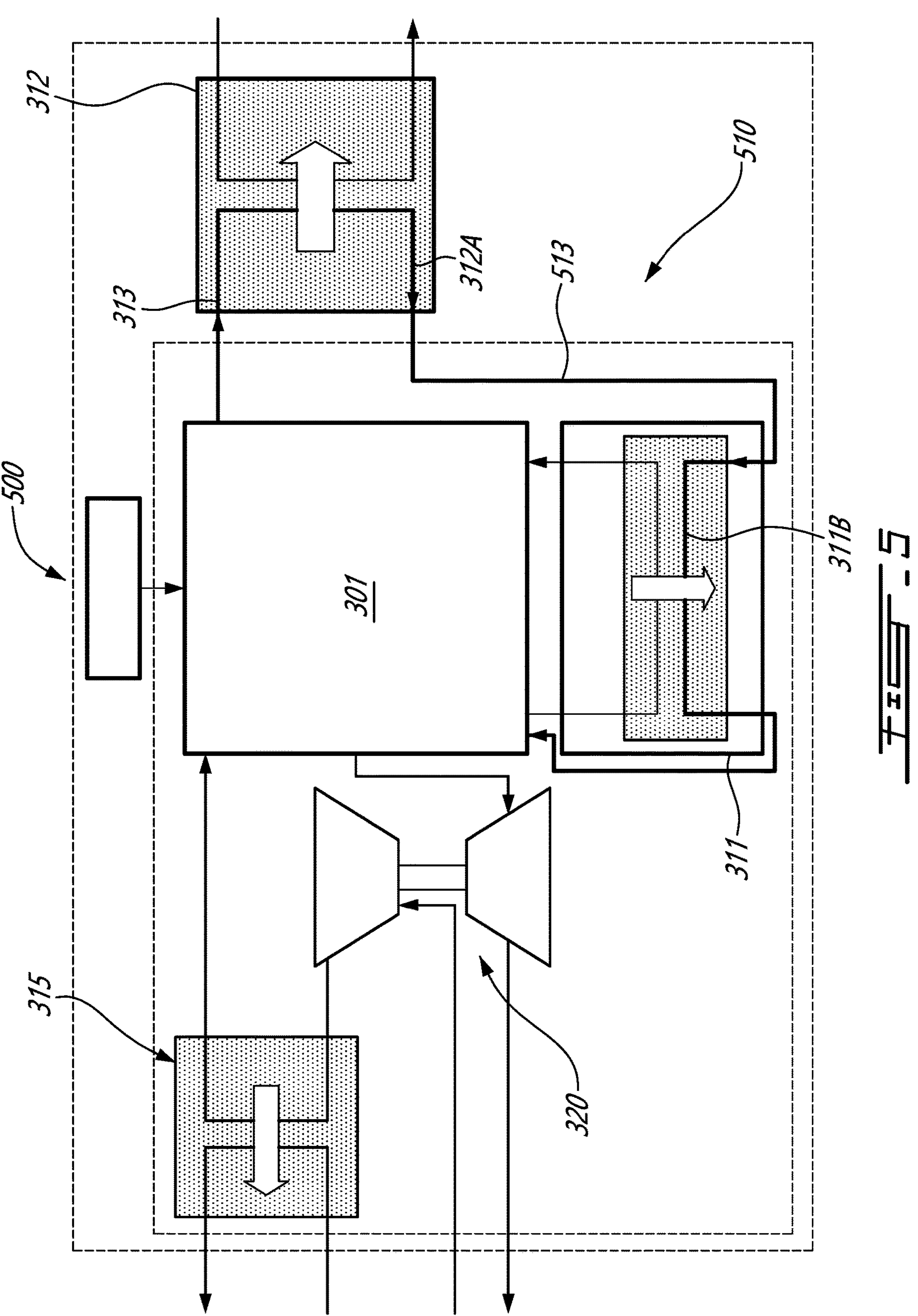
FIG. 5 is a schematic view of an aircraft power plant with a heat management system in accordance with yet another embodiment.

Referring now to FIG. 5, another embodiment of an aircraft power plant is shown at 500. For the sake of conciseness, only features differing from the aircraft power plant 300 described above with reference to FIG. 3 will be described herein below.

In this embodiment, the heat management system 510 includes a single coolant loop 513. That is, the coolant exits the coolant passage of the thermal engine 301 and flows through the second coolant conduit 312A of the coolant-to-air heat exchanger 312. Then, the coolant exits the coolant-to-air heat exchanger 312 and flows through the first coolant conduit 311B of the oil-to-coolant heat exchanger 311. Thus, in this configuration, the coolant flows in series through the coolant-to-air heat exchanger 312 before flowing to the oil-to-coolant heat exchanger 311, which is located downstream of the coolant-to-air heat exchanger 312 relative to the flow of coolant in the single coolant loop 513. The single coolant loop 513 thus extends in series from the thermal engine 301, through the coolant-to-air heat exchanger 312, through the oil-to-coolant heat exchanger 311, and to the thermal engine 301.

Referring now to FIG. 6, in some embodiments, the thermal engine 301 may be the rotary engine 10 of FIG. 1A, which includes housings, such as the side housings 11 and the rotor housing 18 and, in some embodiments, one or more intermediate housing 19 (FIG. 1A). As described above with reference to FIG. 1A, each of those housings includes a dedicated coolant passage. A coolant manifold 306 may be used to fluidly connect to the coolant-to-air heat exchanger 312 to the plurality of coolant passages, which are connected in parallel to the coolant manifold 306. The coolant manifold 306 may have a main inlet and a main outlet fluidly connected to the coolant-to-air heat exchanger, and a plurality of secondary inlets and outlets each fluidly connected to a respective one of the coolant passages of the different housings. Put differently, the coolant passages of the housings are fluidly connected in parallel to the manifold 306.

Referring now to FIG. 7, a method of mitigating heat generation in the thermal engine 301 is shown at 700. The method 700 includes transferring heat from the thermal engine 301 to both of a lubricating oil and a coolant flowing within the thermal engine 301 at 702; and transferring the heat to the environment E outside the thermal engine 301 along: a first heat path extending from the coolant to the environment E via the coolant-to-air heat exchanger 312, and a along a second heat path extending from the oil to the environment E via the coolant through both of the oil-to-coolant heat exchanger 311 and the coolant-to-air heat exchanger 312 at 704.

In the embodiment shown, the transferring of the heat along the first heat path at 704 includes transferring the heat to the environment E via the coolant-to-air heat exchanger 312 located within the engine nacelle 304 and outside the fire-proof enclosure 305. The transferring of the heat along the second heat path includes transferring the heat from the oil to the coolant via the oil-to-coolant heat exchanger 311 located within the fire-proof enclosure 305.

As shown in FIGS. 3-4, the transferring of the heat along the first heat path and the transferring of the heat along the second heat path are performed via a first coolant loop 313 extending through the coolant-to-air heat exchanger 312 and via a second coolant loop 314 extending through the oil-to-coolant heat exchanger 311. In some embodiments, the method 700 includes pre-cooling the coolant before the transferring of the heat along the second heat path through the oil-to-coolant heat exchanger 311.

As shown in FIG. 5, the transferring of the heat along the first heat path and the transferring of the heat along the second heat path are preformed in series via a single coolant loop 513 extending through both of the coolant-to-air heat exchanger 312 and the oil-to-coolant heat exchanger 311.

As shown in FIG. 3, the method 700 may include compressing air with the compressor 321 before feeding the air to the thermal engine 301, and cooling the air downstream of the compressor 321 with the intercooler 315. The intercooler 315 provides heat exchange relationship between the coolant and the air downstream of the compressor 321.

The disclosed heat management systems incorporate the oil-to-coolant heat exchanger 311 within the engine assembly and inside the fire-proof enclosure 305. Thus, instead of carrying the oil to an external liquid-to-air heat exchanger, the cooling is done through an oil to coolant heat exchanger. In some embodiments, with the use of new manufacturing method, the oil-to-coolant heat exchanger, the oil pan and the various manifolding components may be incorporated within one component. The oil pan may also be designed to incorporate the various pump interface, decreasing again the need for external components.

The disclosed configurations may decrease a number of externals components (fittings, pipes, coolers, etc.), to reduce wet weight as well as risk of additional leakage points. The oil no longer exits the fire-proof enclosure 305, also referred to as the fire zone. This may reduce risk of flammable fluid spillage. The handling of the engine block may no longer require dealing with oil piping. There may be a reduced risk of fluid congealing because of shorter cooling loop. A reduction of heat exchanger heat rejection unbalanced may be obtained. The size and load on the oil system may be reduced. These configurations may avoid the use of additional system to merge cold oil, which is more viscous than hot oil.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft power plant, comprising:
- a thermal engine being one of a rotary engine and a piston engine having a combustion chamber of varying volume inside a housing, the housing defining a coolant passage having a coolant passage inlet and a coolant passage outlet, and an oil passage; and
- a heat management system including:
  - an oil-to-coolant heat exchanger having an oil conduit in fluid communication with the oil passage and a first coolant conduit in heat exchange relationship with the oil conduit and in fluid communication with the coolant passage;
  - a coolant-to-air heat exchanger having a second coolant conduit in fluid communication with the coolant passage and an air conduit in heat exchange relationship with the second coolant conduit and in fluid communication with an environment outside the aircraft power plant;

a first coolant loop extending to and from the thermal engine and through the coolant-to-air heat exchanger; and a second coolant loop extending to and from the first coolant loop and through the oil-to-coolant heat exchanger, wherein the coolant passage inlet and the coolant passage outlet of the coolant passage of the housing are fluidly connected to one another via the first coolant conduit of the oil-to-coolant heat exchanger and the second coolant conduit of the coolant-to-air heat exchanger.

2. The aircraft power plant of claim 1, wherein the heat management system is devoid of an oil-to-air heat exchanger.

3. The aircraft power plant of claim 1, comprising an engine nacelle, the thermal engine is enclosed within a fire-proof enclosure located within the engine nacelle, the oil-to-coolant heat exchanger located within the fire-proof enclosure.

4. The aircraft power plant of claim 3, wherein the coolant-to-air heat exchanger is located within the engine nacelle and outside the fire-proof enclosure.

5. The aircraft power plant of claim 1, comprising a coolant pre-cooler facilitating heat exchange between the coolant and the environment.

6. The aircraft power plant of claim 5, wherein the second coolant loop extends through the coolant pre-cooler.

7. The aircraft power plant of claim 1, comprising:

a turbocharger having a compressor drivingly engaged by a turbine, the turbine fluidly connected to an exhaust of the thermal engine, and an intercooler facilitating heat exchange between the coolant and compressed air exiting the compressor, the first coolant loop or the second coolant loop extending through the intercooler.

8. The aircraft power plant of claim 1, wherein the thermal engine is a rotary engine having housings secured to one another and including a first side housing, a second side housing, and a rotor housing disposed between the first side housing and the second side housing, the coolant passage including a plurality of coolant passages each extending within a respective one of the housings, a coolant manifold fluidly connected to the coolant-to-air heat exchanger, the plurality of coolant passages connected in parallel to the coolant manifold.

9. A method of mitigating heat generation in a thermal engine, the thermal engine having a combustion chamber having a volume periodically increasing and decreasing during operation of the thermal engine, the method comprising:

transferring heat from the thermal engine to both of a lubricating oil and a coolant flowing within the thermal engine; and transferring the heat to an environment outside the thermal engine along:

a first heat path extending from the coolant to the environment via a coolant-to-air heat exchanger; and a second heat path extending from the oil to the environment via the coolant through both of an oil-to-coolant heat exchanger and the coolant-to-air heat exchanger, wherein the transferring of the heat along the first heat path and the transferring of the heat along the second heat path are performed via a first coolant loop extending through the coolant-to-air heat exchanger and via a second coolant loop extending through the off-to-coolant heat exchanger.

10. The method of claim 9, wherein the thermal engine is located within a fire-proof enclosure contained within an engine nacelle, the transferring of the heat along the first heat path includes transferring the heat to the environment via the coolant-to-air heat exchanger located within the engine nacelle and outside the fire-proof enclosure.

11. The method of claim 10, wherein the transferring of the heat along the second heat path includes transferring the heat from the oil to the coolant via the oil-to-coolant heat exchanger located within the fire-proof enclosure.

12. The method of claim 9, further comprising pre-cooling the coolant before the transferring of the heat along the second heat path through the oil-to-coolant heat exchanger.

13. The method of claim 9, comprising:

compressing air with a compressor before feeding the air to the thermal engine, and cooling the air downstream of the compressor with an intercooler, the intercooler providing heat exchange relationship between the coolant and the air downstream of the compressor.

14. An aircraft power plant, comprising:

a rotary internal combustion engine having a combustion chamber of varying volume, the rotary internal combustion engine having housings defining respective coolant passages and defining an oil passage for lubrication, the rotary internal combustion engine having a rotor, the combustion chamber defined conjointly by the rotor and the housing, the volume of the combustion chamber varying with rotation of the rotor within the housing, the housings including a first side housing, a second side housing, and a rotor housing disposed between the first side housing and the second side housing, each of the coolant passages extending within respective one of the housings; and a heat management system, having:

an oil-to-coolant heat exchanger having an oil conduit in fluid communication with the oil passage and a first coolant conduit in heat exchange relationship with the oil conduit and in fluid communication with the coolant passages;

a coolant-to-air heat exchanger having a second coolant conduit in fluid communication with the coolant passages and an air conduit in heat exchange relationship with the second coolant conduit and in fluid communication with an environment outside the aircraft power plant, the respective coolant passages fluidly connected in parallel to the second coolant conduit; and a coolant manifold fluidly connected to the coolant-to-air heat exchanger the coolant passages connected in parallel to the coolant manifold, wherein the heat management system defines a heat transfer path from oil flowing through the oil passage to the environment via a coolant flowing through the coolant-to-air heat exchanger.

15. The aircraft power plant of claim 14, comprising an engine nacelle, the rotary internal combustion engine is enclosed within a fire-proof enclosure located within the engine nacelle, the oil-to-coolant heat exchanger located within the fire-proof enclosure.

16. The aircraft power plant of claim 15, wherein the coolant-to-air heat exchanger is located within the engine nacelle and outside the fire-proof enclosure.

* * * * *